US012086862B2

(12) United States Patent
Ericson et al.

(10) Patent No.: US 12,086,862 B2
(45) Date of Patent: *Sep. 10, 2024

(54) METHOD, NON-TRANSITORY MACHINE-READABLE MEDIUM, AND SYSTEM FOR MERCHANT-SIDE INTEGRATED SHOPPING CART RECOVERY

(71) Applicant: PAYPAL, INC., San Jose, CA (US)

(72) Inventors: Braden Christopher Ericson, San Jose, CA (US); Arvind Naidu, Santa Clara, CA (US); Harshal Deo, San Jose, CA (US); Prasanna Vinjamuri, Sunnyvale, CA (US)

(73) Assignee: PAYPAL, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/510,241

(22) Filed: Oct. 25, 2021

(65) Prior Publication Data
US 2022/0076321 A1 Mar. 10, 2022

Related U.S. Application Data

(63) Continuation of application No. 16/235,657, filed on Dec. 28, 2018, now Pat. No. 11,157,989.

(Continued)

(51) Int. Cl.
G06Q 30/00 (2023.01)
G06F 21/31 (2013.01)
G06Q 30/0601 (2023.01)

(52) U.S. Cl.
CPC ......... G06Q 30/0633 (2013.01); G06F 21/31 (2013.01); G06Q 30/0615 (2013.01); G06Q 30/0643 (2013.01)

(58) Field of Classification Search
CPC .................................. G06Q 30/0601–0645
See application file for complete search history.

(56) References Cited

U.S. PATENT DOCUMENTS 9,247,314 B1  1/2016  Parambath et al.
10,489,761 B2 * 11/2019  Pinski ................... G06Q 20/12
(Continued)

OTHER PUBLICATIONS

Xing, Luyi, et al. "Integuard: Toward automatic protection of third-party web service integrations." Network & Distributed System Security Symposium (NDSS). 2013. (Year: 2013).*

(Continued)

Primary Examiner — Michael Misiaszek
Assistant Examiner — Kennedy Gibson-Wynn
(74) Attorney, Agent, or Firm — Haynes and Boone, LLP

(57) ABSTRACT

A method for merchant-side tracking of customer selections includes receiving, via a user list script on a merchant webpage, a user selection of a product representation displayed on a UI of a user device. The method includes updating a user list with the user selection, the user list associated with a generic user representation. The method includes determining, based on a type of identifier associated with a user of the user device, to use a generic user representation with the user list. The method includes selecting, based on the generic user representation, an anonymous user flow type for tracking the user as an anonymous user of the merchant webpage. The anonymous user flow type associates the user device with the user list independently of associating the user with the merchant.

20 Claims, 12 Drawing Sheets

Related U.S. Application Data

(60) Provisional application No. 62/724,018, filed on Aug. 28, 2018.

(56) References Cited

U.S. PATENT DOCUMENTS

| | | |
|---|---|---|
| 2003/0065577 A1 | 4/2003 | Haynes et al. |
| 2014/0019297 A1 | 1/2014 | Iskra et al. |
| 2015/0081457 A1* | 3/2015 | Agnes ............... G06Q 30/0635 |
| | | 705/14.73 |
| 2016/0019628 A1* | 1/2016 | Udumudi ........... G06Q 30/0633 |
| | | 705/26.1 |
| 2016/0162977 A1* | 6/2016 | Conchola ............ G06Q 20/322 |
| | | 705/26.8 |
| 2017/0193591 A1 | 7/2017 | Narasimhan et al. |
| 2017/0256000 A1 | 9/2017 | Isaacson et al. |
| 2018/0075515 A1 | 3/2018 | Yancey et al. |
| 2018/0158129 A1 | 6/2018 | Kohli |
| 2020/0082459 A1 | 3/2020 | Varma |

OTHER PUBLICATIONS

Heinonen, Kalle. "Optimizing sales of online shopping cart within the digital customer life cycle." (2010). (Year: 2010).*
Gibson-Wynn K., "Bizrate Insights and Forrester Research's Sucharita Mulpuru: Online Marketplaces Offer Access to Customers and a Universal Shopping Cart," Electronic commerce, Retail stores, Web sites, Shopping, Jun. 12, 2012, 3 pages.
International Appl. No. PCT/US2019/048651, International Preliminary Report on Patentability mailed Mar. 11, 2021, 13 pages.
International Appl. No. PCT/US2019/048651, International Search Report and Written Opinion mailed Nov. 4, 2019, 14 pages.

* cited by examiner

METHOD, NON-TRANSITORY MACHINE-READABLE MEDIUM, AND SYSTEM FOR MERCHANT-SIDE INTEGRATED SHOPPING CART RECOVERY

RELATED MATTERS

This application claims priority benefit of U.S. Provisional Patent Application Ser. No. 62/724,018, titled "Merchant-side Integrated Shopping Cart Recovery" filed on Aug. 28, 2018 and U.S. patent application Ser. No. 16/235,657, titled "Merchant-side Integrated Shopping Cart Recovery" filed Dec. 28, 2018.

BACKGROUND

Embodiments of the inventive subject matter generally relate to the field of optimizing cart recovery operations between servers providing services and their clients.

Many transactions are completed over the Internet, including selection, ordering, and purchasing of items that can include products and/or services. During a certain purchasing session, a consumer can visit a merchant website provided by a merchant to search for items of interest. The consumer can select item(s) and add these to a shopping cart. The shopping cart can be implemented using various techniques, such as by using databases, and/or various data structures. Thus, the shopping cart can contain the item(s) selected during that session. When the consumer has finished the shopping session and wishes to complete the transaction, typically the items in the shopping cart are presented for review. Once the shopping cart is reviewed, an authorization process for payment for this transaction can be started.

Often, however, the online transaction is not completed, and the transaction is abandoned. This can happen for several reasons, for example if the consumer loses interest, is distracted, finds an alternative merchant, or did not intend to complete the transaction. This type of uncompleted transactions can be referred to as shopping cart abandonment. Various solutions for recovering cart abandonment exist, however they often have various technical and logistical problems. For example, one cart abandonment solution can require the consumer to log into and authenticate with the merchant server providing the merchant website. Some solutions can require the merchant to write and/or incorporate large amounts of code for shopping cart functionality.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

The description that follows includes exemplary systems, methods, techniques, instruction sequences and computer program products that embody techniques of the present inventive subject matter. However, it is understood that the described embodiments may be practiced without these specific details. The discussion below relates to merchant-side integrated shopping cart recovery. However, it is possible, using a combination of methods discussed herein, to apply to other technical areas.

Figure 1:
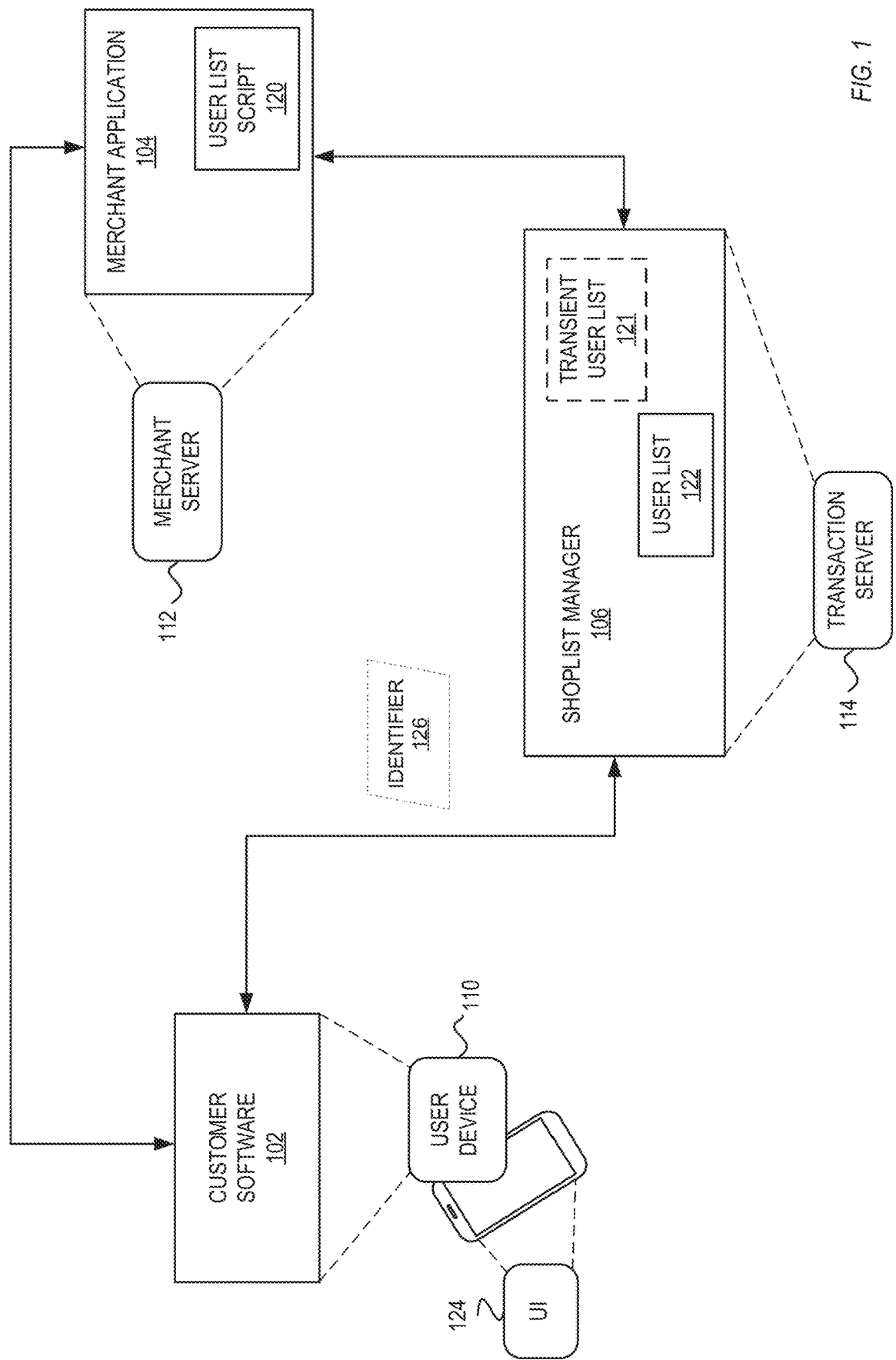
FIG. 1 is a system diagram illustrating embodiments of a system that implements merchant-side integrated shopping cart recovery, according to some embodiments.

FIG. 1 is a system diagram illustrating embodiments of a system that implements merchant-side integrated shopping cart recovery (also referred to as "shoplist"). The shoplist system can be implemented using a shoplist manager 106 at a transaction server 114. A customer (e.g., a user of the user device 110) can access, via a customer software (e.g., an application and/or a browser) 102 on the user device, a merchant application 104 that is provided (e.g., hosted) by a merchant server 112. The merchant application 104 can display representations (e.g., icons) of various items (e.g., products and/or services) offered by a merchant for purchase or use by the customer. For example, the merchant application 104 can offer various products that can be selected and/or customized using the customer software 102. In another example, the merchant application 104 can offer various Software-as-a-Service (SaaS) services that can be selected for use on the customer's user device 110. The customer can make selections, via the customer software 102, elements for purchase/use from the elements shown via the merchant application 104. In some embodiments, a third party (e.g., a service provider, not shown in FIG. 1) can provide and/or host some elements of the merchant application 104.

The transaction server 114 can provide shoplist functionality for the merchant via a user list script 120. The user list script 120 can be implemented as a script, an add-in, a code snippet, and/or an embedded button, among others. The user list script 120 can be embedded or otherwise integrated into the merchant application 104. The user list script 120 can, for example, execute inside an iFrame (e.g., via the shoplist manager 106) embedded in the merchant application 104. The user list script 120 can be executed during access of the merchant application 104 by the customer software 102. In some embodiments, the user list script 120 can facilitate monitoring, recording, and/or analyzing customer interaction, as can be provided by the customer software 102, with the merchant application 104. In some embodiments, the user list script 120 can provide various UI elements in the merchant application 104 for display and/or interaction using the customer software 102.

In some embodiments, the user list script 120 can determine user selection of the items at the merchant application 104. In some embodiments, the user list script 120 can store representations of the selected items/services in a user list 122 that can contain a list of the representations. In some embodiments, the user list script 120 can communicate with a shoplist manager 106 that is hosted by the transaction server 114. The shoplist manager 106 can then generate one or more carts for one or more merchants based on the user list 122. The shop list manager 106 can create and store the user list 122, or use a transient user list 121, independently of whether the user has logged into the merchant application 104 and/or to the transaction server 114.

In some embodiments, the shoplist manager 106 can store a transient user list 121 for user selections that are made using an anonymous flow. In anonymous flow, an anonymous user can access the merchant application 104 and select items. The shoplist manager 106 can determine to use a generic user representation for the anonymous user. These selections can be recorded by the user list script 120. Although the user list script 120 can prompt, via the merchant application 104, for user identification, in anonymous flow no identification is received.

The shoplist manager 106 can track the anonymous user for a duration of a session between the customer software 102 and the merchant application 104. The transient user list 121 can be valid for duration of the session, unless the anonymous user provides additional identifying information. In some embodiments, the user list script 120 can continue to track the anonymous user using another session between the customer software and another merchant application that uses another instance of the user list script 120. Thus, the distinct instances of the user list script can continue to track the anonymous user and user selections in both merchant applications, such as by matching information about the customer software used between sessions.

In some embodiments, the transient user list 121 is implemented at the user list script 120 for anonymous users, and can be deleted if the user doesn't provide any additional identifying information (i.e., that would change the flow to guest flow, recognized flow, or identified flow). In some embodiments, the transient user list 121 is stored at the shoplist manager 106.

Once the user provides some identifying information, the anonymous user can be processed (by the shoplist manager 106) as a guest user. In some embodiments, when using the guest flow, the shoplist manager 106 can save the user selections without a user log-in into the merchant server webpage 104 or to the shoplist manager 106. As part of the guest flow, the shoplist manager 106 can associate an identifier 126 with the guest user. The shoplist manager 106 can create the identifier 126 (e.g., a token) that is associated with a certain customer software session via which the customer uses the customer software 102 to access the merchant application 104. The identifier 126 can be associated with the user list 122 for that user. In some embodiments, the identifier 126 can be stored locally on the user device 110. In some embodiments, the identifier 126 can be created and stored at the merchant server 112, the transaction server 114, and/or a cloud.

Once the user receives an email and verifies identity, or logs into the shoplist manager 106, the guest user can be processed (by the shoplist manager 106) as a recognized user. Recognized users are users that are being tracked by the shoplist manager 106, but that have not yet been authenticated for the merchant application 104. The shoplist manager 106 can store the user list 122 that can be accessed from any user device by recognized users, e.g., after user authentication. The user list 122 can be merged with additional transient user lists for other sessions, e.g., between the recognized user (while initially in anonymous/guest flow for the other sessions) and the merchant application 104 and/or merchant applications for different merchants. In some embodiments, the shoplist manager 106 can generate carts (for merchants corresponding to the selected items) for the recognized users based on contents of the user list 122, and process payments for the recognized users, without requiring user authentication at the merchant(s).

Once the user authenticates into the merchant application 104, the recognized user can be processed (by the shoplist manager 106) as an identified user. Thus, identified users are users that that are being tracked by the shoplist manager 106 and that have been authenticated for the merchant application 104. The shoplist manager 106 can create carts for the corresponding merchants, who can then process the carts.

In some embodiments, the merchant application 104 can be implemented via a webpage that can be provided by a web server. The webpage can be accessed by the customer software 102 (e.g., a web browser on the user device 110). In some embodiments, the merchant application 104 can be implemented using a server that uses RESTFUL API, SOAP API, and/or other technology, to communicate with the customer software 102 (e.g., a customer application on the user device 110). Thus, similar functionality can be provided to the customer software 102 and/or to the shoplist manager 106, regardless of how the merchant application 104 is implemented. However, the implementation of the user list script 120 may vary depending on how the merchant application 104 is implemented.

The shoplist manager 106 can track the user and occasionally prompt the user to log-in and/or provide some identifying information, such as an email address. Responsive to receiving identifying information, the shoplist manager 106 can switch to a recognized flow. In some embodiments, responsive to receiving the users email address, the shoplist manager 106 can associate the identifier 126 with the email address. The shoplist manager 106 can then generate and send, to the user, the email that indicates the user list 122. If the user has not provided the log-in or an email address, the shoplist manager 106 can continue to track the user for future interaction and follow up regarding the user list 122. In some embodiments, once in the identified flow, the user can opt-out completely or partially in subsequent sessions that use the shoplist, thus switching to the anonymous or guest flow.

In some embodiments, the system discussed in FIG. 1 can facilitate a method and a system for merchant-side tracking of customer selections. The method can include receiving, via a user list script 120 on a merchant webpage 104, a user selection of a product representation displayed on the UI 124 of a user device 110. The method includes updating the user list 122 with the user selection, the user list 122 associated with a generic user representation. The method includes determining, based on a type of identifier associated with a user of the user device 110, to use a generic user representation with the user list 122. The method includes selecting, based on the generic user representation, an anonymous user flow type for tracking the user as an anonymous user of the merchant webpage 104. The anonymous user flow type associates the user device 110 with the user list 122 independently of associating the user with the merchant.

It is further noted that in some embodiments, the shoplist manager 106 can manage the user list 122 for the same user across multiple merchants. The shoplist manager 106 can determine identity of the user based on certain interaction at the merchants and/or a login at the shoplist manager 106. The shoplist manager 106 can thus separate authentication at the merchant(s) from authentication (which can arise from the customer login) at the shoplist manager 106. Thus, the shoplist cart can be used across multiple merchants without customer logging into any of their respective merchant applications. The shoplist manager 106 can then generate multiple carts for each of the merchants based on the user list 122 for a certain user.

Thus, the shoplist manager 106 can identify and/or authenticate the user. The shoplist manager 106 can associate the user list 122 with the user's account at the transaction server 114. Once a user has successfully logged into their shoplist manager 106 account, the shoplist manager 106 can provide and/or store an identifier 126, such as dropping long-live cookie onto the user device 110 that can allow the shoplist manager 106 to recognize the user across merchants. The user can give consent to the cross-merchant recognition and identification.

In some embodiments, the user can select an opt-out from the identified flow. Depending on if the user is handled by the shoplist in the recognized flow vs the identified flow, the opt-out can be handled a little differently. For recognized flow, the user session may only be associated with the user device 110. To opt-out, the user can select an opt-out link (e.g., within their email) and it would take them to the page shown here. Once opted-out, the shoplist manager 106 can delete the user list 122 and remove an upfront display of the users obfuscated email address.

If the user is an identified user, their opt-out preferences can be saved by the shoplist manager 106, such as by an identifier 126 stored at the user device 110. In some embodiments, to opt-out the user may change preferences associated with the identifier 126. Once opted-out, the shoplist manager 106 could retain the items saved within the user list 122 (e.g., as part of the guest flow). In some implementations, if the user wishes to remove saved items, they can simply delete the items within the guest experience, e.g., from the user list 122 as accessed via the merchant application.

Figure 2:
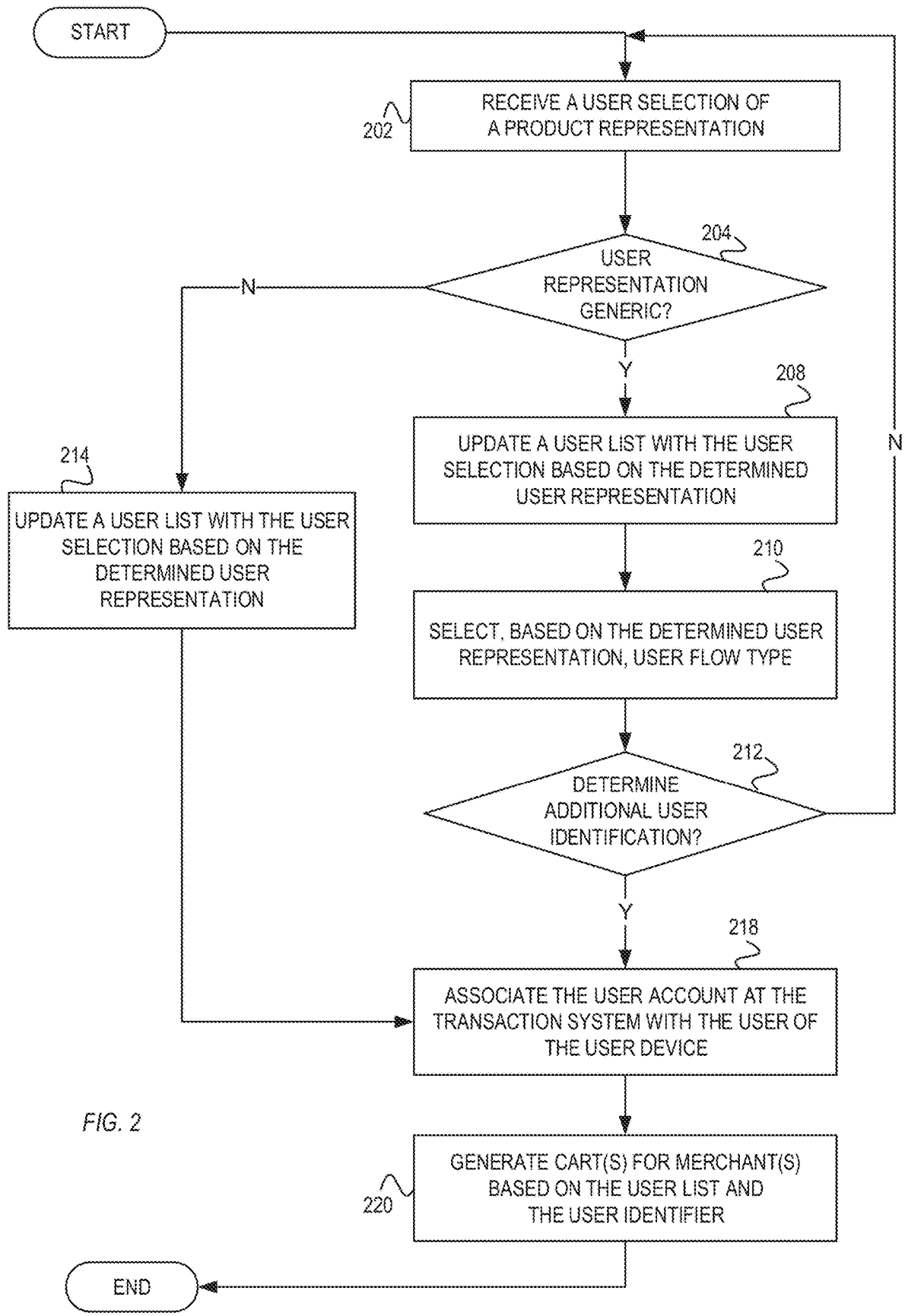
FIG. 2 is a flow diagram illustrating embodiments of operations for implementing merchant-side integrated shopping cart recovery.

FIG. 2 is a flow diagram illustrating embodiments of operations for implementing merchant-side integrated shopping cart recovery. The flow diagram of FIG. 2 is described with reference to the systems and components described in FIG. 1 (for illustration purposes and not as a limitation). The example operations can be carried out by the shoplist manager 106 and/or by the user list script 120.

Beginning with 202, the shoplist manager 106 receives a user selection of a product representation. As discussed below, the shoplist manager 106 can receive the user selection from the user script 120. The user selection can be for a product representation that is displayed on the UI 124, as provided by the merchant application 104. The shoplist manager 106 can receive the user selection during a communication session between the customer software 102 and the merchant application 104.

At 204, the shoplist manager 106 determines whether the user representation is generic. The shoplist manager 106 can make this determination based on several factors, such as whether there is an identifier that is associated with the customer software 102 instance, and/or with the user device 110. The shoplist manager 106 can make this determination based on what type of user flow, if any, is selected for the current session between the customer software 102 and the merchant application 104. If the shoplist manager 106 determines that that the user representation is generic, flow continues at 208, otherwise the flow continues at 214.

At 208, the shoplist manager 106 updates a user list with the user selection based on the determined user representation. The shoplist manager 106 can update the user list 122 (or the transient user list 121) that is associated with the current session, with the user, and/or with the user device 110. For the recognized user flow, the shoplist manager 106 can update the user list 122 using a separate user authentication from an authentication of the merchant application 104.

The shoplist manager 106 can use the identifier 126 by using a digital fingerprint that is associated with the user, the user session, and/or the user device 110. The digital fingerprint can include various characteristics of the user device 110 and/or the current session that can be used by the shoplist manager 106 to identify the user device 110 and/or the user in subsequent communication between the customer software 102 and the merchant application 104, and/or other merchant applications (e.g., for different merchants) using different communication sessions. The digital fingerprint can be stored by the shoplist manager 106, such as on the transaction server 114, or in data storage accessible by the shoplist manager 106 such as by using cloud-based storage.

The shoplist manager 106 can use the identifier 126 implemented as a token that is stored at the user device 110. The token can be implemented as a cookie that is stored at the user device 110. The token can be implemented as identifying data that is communicated by the customer software 102 with the merchant application 104 (such that can be identified by the user list script 120). Depending on the type of user flow associated with the user and/or the current session, the shoplist manager 106 can switch between using the digital fingerprint, a token, and/or an email address, among others, as the identifier 126 for the user and/or the current session.

At 210, the shoplist manager 106 selects, based on the determined user representation, the user flow type. As discussed below, if the user does not log into the merchant application 104 and/or the shoplist manager 106, the guest user flow can be selected. As discussed below, if the user logs into shoplist manager 106, the recognized user flow can be selected. As discussed below, if the user logs both into shoplist manager 106 and the merchant application 104, the identified user flow can be selected. In some embodiments, once the user logs into the merchant application 104, a login into the shoplist manager is also applied. Once the user logs into the respective system, that system can authenticate the user.

At 212, the shoplist manager 106 determines whether additional user identification has been provided, e.g., that can be used for user authentication. For example, the shoplist manager 106 can determine, based on an identifying user selection, a user association with the user list 122 (or with the transient user list 121). The shoplist manager 106 can access a user login to the merchant application 104. The user can also login to the shoplist manager 106. If the shoplist manager 106 determines that that additional user identification is provided, flow continues at 218, otherwise the flow continues back at 202.

At 214, the shoplist manager 106 updates the user list with the user selection based on determined user representation. Step 214 is performed after a determination at 204. The flow continues to step 218 after step 214. At 214, the shoplist manager 106 can be in a non-guest user flow, such as recognized user flow or identified user flow.

In is noted that the user can access another merchant, where another user script on another merchant application can provide additional user selection for another product. The shoplist manager 106 can update the user list 122 with the additional user selection for that other merchant. The shoplist manager 106 can determine, based on the anonymous user flow type and on the receipt of the other user selection, a recognized user flow type that associates the user both merchants.

At 218, the shoplist manager 106 associates the user account at the transaction system with the user of the user device. The shoplist manager 106 can make this association in response to determining the user association, and also select the identified user flow type for tracking the user as an identified user of the merchant application 104. In response to using the identified user flow type, the shoplist manager 106 provide the identifier to the user device 110, such as by dropping a cookie on the user device 110. As discussed above, the token can be used for user identification and associating the user with the merchant.

As discussed below, the user can opt-out of the identified user flow. The shoplist manager 106 can receive a selection to disassociate the user from the user list 122. The shoplist manager 106 can then select the anonymous or the guest user flow type. The shoplist manager 106 can delete any tokens from the user device 110, such as by deleting the cookie from the user device 110. The shoplist manager 106 can also disassociate the user from the merchant.

At 220, the shoplist manager 106 generates one or more carts for one or more merchant(s) based on the user list and the user identifier. The shoplist manager 106 can, in response to determining the user association, generate a cart based on the user list 122. The shoplist manager 106 can generate the cart for submission at the merchant application 104. The shoplist manager 106 can submit the cart independently of the user authenticating at the merchant application 104. For cases where there are multiple merchants accessed by the user, the shoplist manager 106 can determine generate a second cart based on the user list, the cart for submission at the second merchant.

Figure 3A:
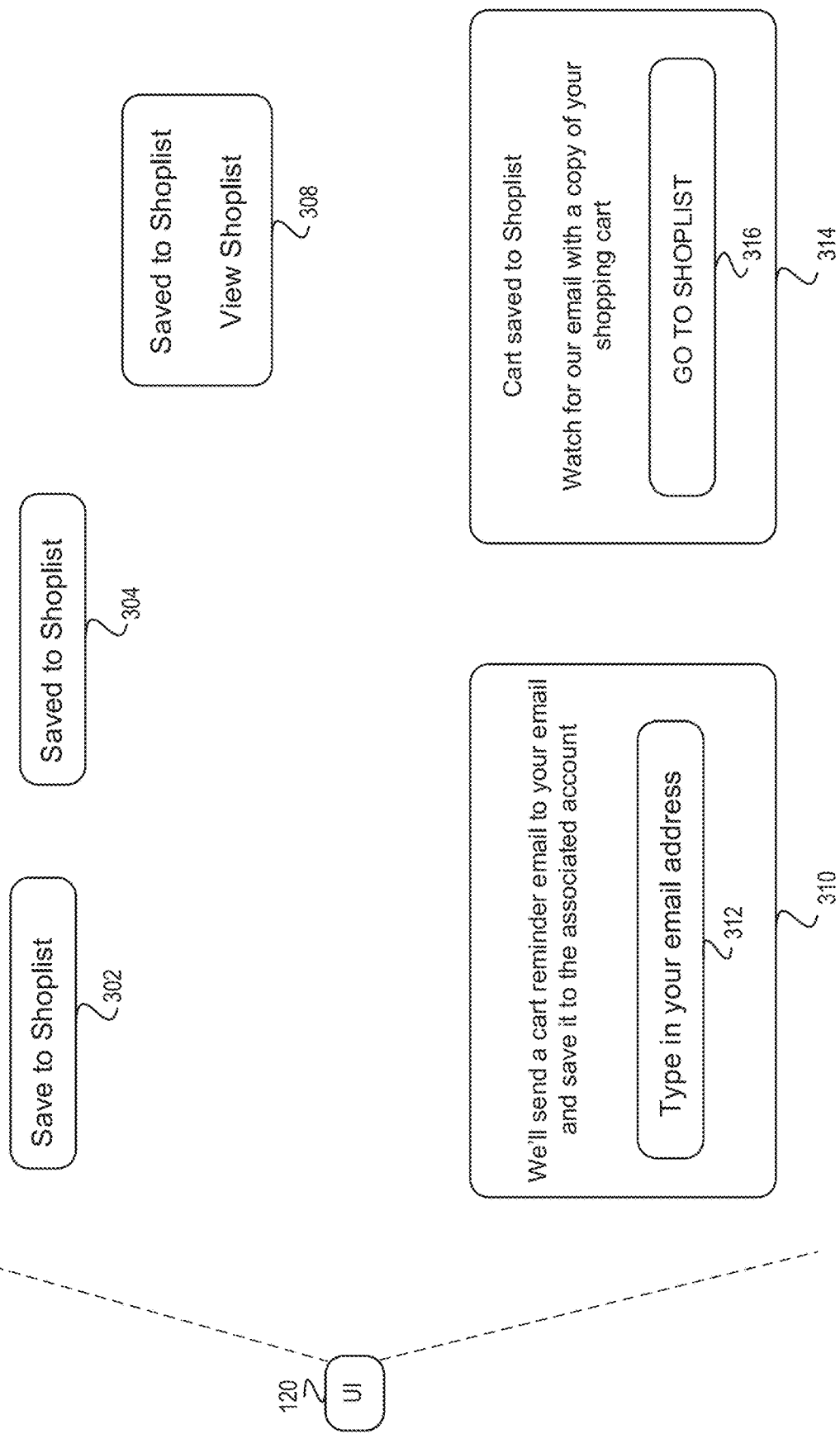
FIGS. 3A and 3B are diagrams illustrating embodiments of various UI elements that can be provided to the customer when accessing functionality of the merchant-side integrated shopping cart recovery.
Figure 3B:
Figure 3B:
Figure 3B:

FIGS. 3A and 3B are diagrams illustrating embodiments of various UI elements that can be provided to the customer when accessing functionality of the merchant-side integrated shopping cart recovery. FIGS. 3A and 3B show guest experience for a user who has not interacted with the shoplist manager 106 before. The can see the guest experience (i.e., via the guest flow) when clicking "save to ShopList" in the UI 124. During the guest flow, the shoplist manager 106 can provide (e.g., to the user device 110) a token or another identifier 126 that can be used to identify the user on the existing session for further user list saving. In some embodiments, the token can be implemented (e.g., via element 308) as "soft" cookie. The use of the identifier 126 allows the user to continue to save items in the user list 122 while in the guest flow.

As part of the guest experience, in element 310 the shoplist manager 106 can prompt 312 the user for an email address. Once the email (or another user identifier) is submitted, the shoplist manager 106 can associate the items with the user saved to a session_id (e.g., using a GUID). At this point the shoplist manager 106 can switch to a different flow (e.g., the recognized flow, in which an email can be sent to the user indicating the saved items (as also indicated by elements 308, 314, and 316. If the user enters his or her email address, and/or another identifier, the shoplist manager 106 can switch to the recognized flow, in which the user is recognized but not necessarily identified. The shoplist manager 106 can enter into the identified flow for the user once the user confirms his or her identity and/or acknowledges being tracked by the shoplist manager 106 and having information shared with the merchant application 104.

Once in the recognized flow, the shoplist manager can track the user's selections without needing to receive re-enter the user's email (or another identifier) upon each selection. Thus, if the user logs into their shoplist account (e.g., at the shoplist manager 106) on the same soft session (not via email), the shoplist can associate the items to their account via the recognized flow. For shared user devices, if the account of a new user accesses is not associated with the original email (or another identifier), the shoplist manager 106 will not save the items to the original user list 122, and instead use another user list (either a new user list or another one that is determined to be associated with the new user). While in the recognized flow, the shoplist manager 106 can send an email to the user device 110. For users with user accounts at the shoplist manager 106, if the user enters ShopList from the email, they can be asked to login to the shoplist manager 106. Once the user logs in, they will be shown their user list 122 and/or individual carts for each merchant (e.g., as created from the user list 122).

Once the user is processed via the recognized flow, the shoplist manager 106 can continue to use the same identifier 126 from the guest flow, modify the existing identifier 126 to indicate additional identifying information, or use a new identifier 126. The shoplist manager 106 can, for example, drop a long-term cookie, or ask for consent to drop cookie, that will allow the user to be opted-in for the identified user experience. For the identified user experience, the shoplist manager 106 can provide an obfuscated email that identifies the user (possibly show the name). The email can include a "not you" link next to it, that if selected by the user, would place the user back into the guest experience, which includes clearing any identifiers 126 (such as cookies) from the user device 110. This situation may arise on shared user devices.

FIG. 3B illustrates embodiments of implementations of the UI elements of FIG. 3A. These UI elements 322(1), 322(2), 324(1), and 324(2) can be provided to the customer software 102 by the merchant application 104. The UI elements can be rendered on the user device 110, such as via an iFrame of the merchant webpage 104 (that implements the merchant application 104) that is accessed by a web browser 102 (that implement the customer software 102). The different implementations of the UI element 322(1) can include checkbox, button, and toggle elements. The UI element 322 can allow the user to save items as accessed on the merchant application 104, or entire carts that have been selected by the user for that merchant. It is noted that in the discussion below, either the user list 122 (as discussed) or the transient user list 121 can be used, depending on the user flow.

In some embodiments, the checkbox can allow users to save items, to the user list 122, after completing a page action (e.g., can augment an existing user experience). In some embodiments, the checkbox can have trigger functionality that enables an action for the user list 122 (e.g., adding selected elements to the user list 122) upon detecting another action. The checkbox element can be typically checked or unchecked. In some embodiments, as long as the checkbox is checked, additional items can be added automatically to the user list 122 by the shoplist manager 106, similar to a continuous saving functionality.

In some embodiments, the button element can enable a one-time save that would allow individual carts or products to be saved to the user list 122. A one-time save for a cart can be implemented as everything on rendered on the screen, and can be saved to the user list 122. In some embodiments, any SKU numbers (e.g., as discussed below) that are passed from the merchant to the Shoplist can also be saved to the user list 122.

In some embodiments, the Toggle component can allow merchant-side created carts to be synchronized with the cart in the shoplist manager 106. In some embodiments, the merchant-side cart can be synchronized with the user list 122 that includes elements and/or carts from other merchants. In some embodiments, the toggle component can allow the user list 122 (or a portion of the user list 122 if the user list 122 is used for multiple merchants) to be re-build into the merchant-side cart. With reference to FIG. 1, the merchant-side cart can be generated and/or provided to the merchant server 112. This functionality can be useful for when the user list 122 is maintained for a certain user who accesses the merchant application 104 at different times/different sessions, including from different user device. For example, the user list 122 can be maintained for the same user across multiple user sessions at the same merchant.

Figure 4:
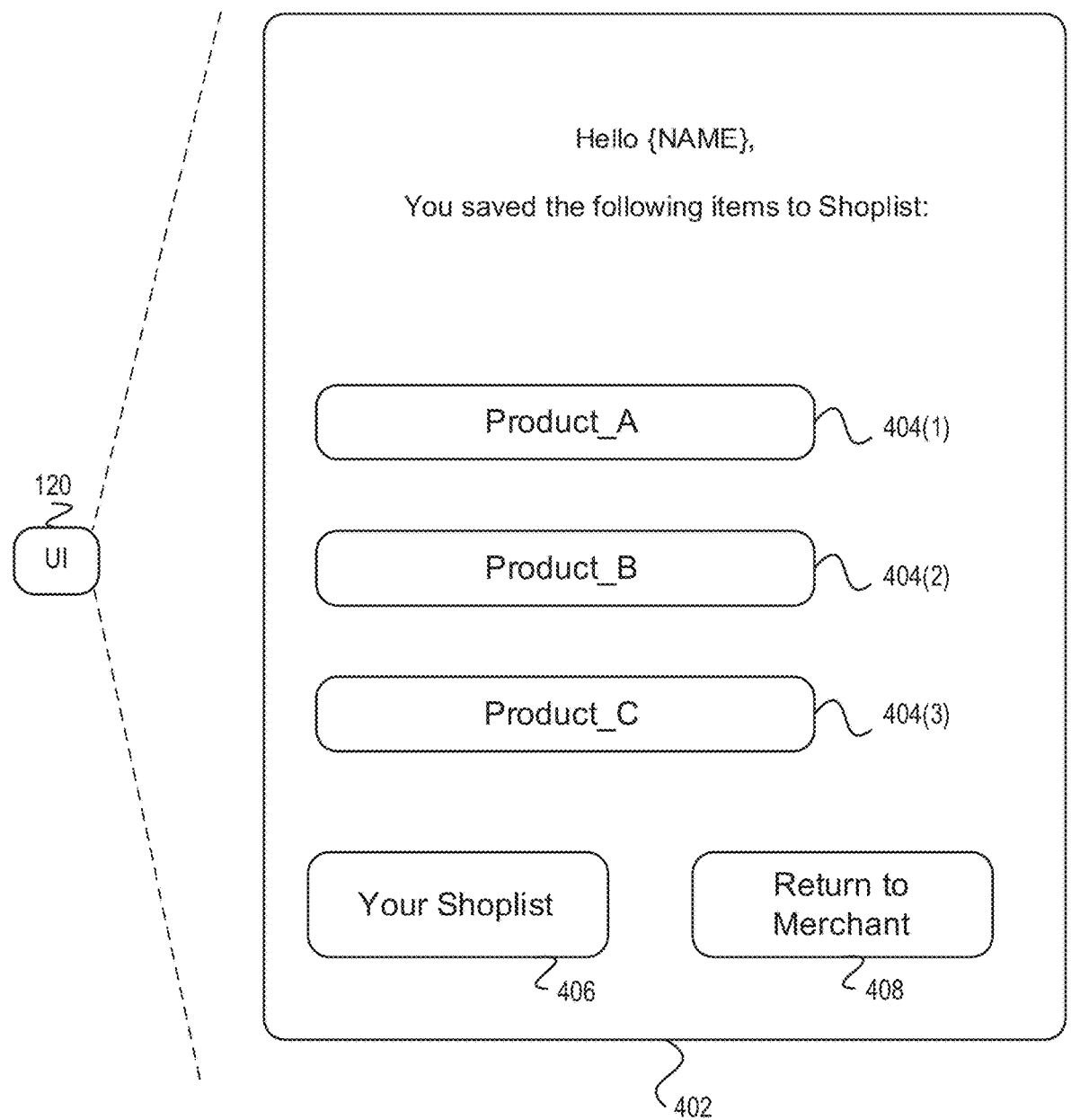
FIG. 4 illustrates embodiments of various UI elements that can be provided to the customer software.

FIG. 4 illustrates embodiments of various UI elements that can be provided to the customer software. FIG. 4 shows an example email 402 (e.g., as can be displayed on the UI 124) listing elements 404(1)-404(3) of the user list 122. The email 402 can be sent from the shoplist manager 402 to the user as part of the guest flow or the recognized flow, e.g., after the user enters his or her email, but before the user is authenticated. In some embodiments, once the user is authenticated, the shoplist manager 106 can switch to the identified flow. In some embodiments, the contents of the user list 122 can be stored in a temporary storage until the user logs in and claims the products. From the email, the user can log in and view their user list 122, such as by selecting the "your Shop List" link 406. If the user can also directly access the shoplist manager 106 to signs-in. The email 402 can also include a portion of an opt-out process. The email 402 also includes a return to merchant link 408, which upon selection could trigger the shoplist manager 106 to create a cart for the merchant application 104. The selection of the return to merchant link 408 could also provide access to the merchant application 104 via the UI 124.

Figures 5A, 5B:
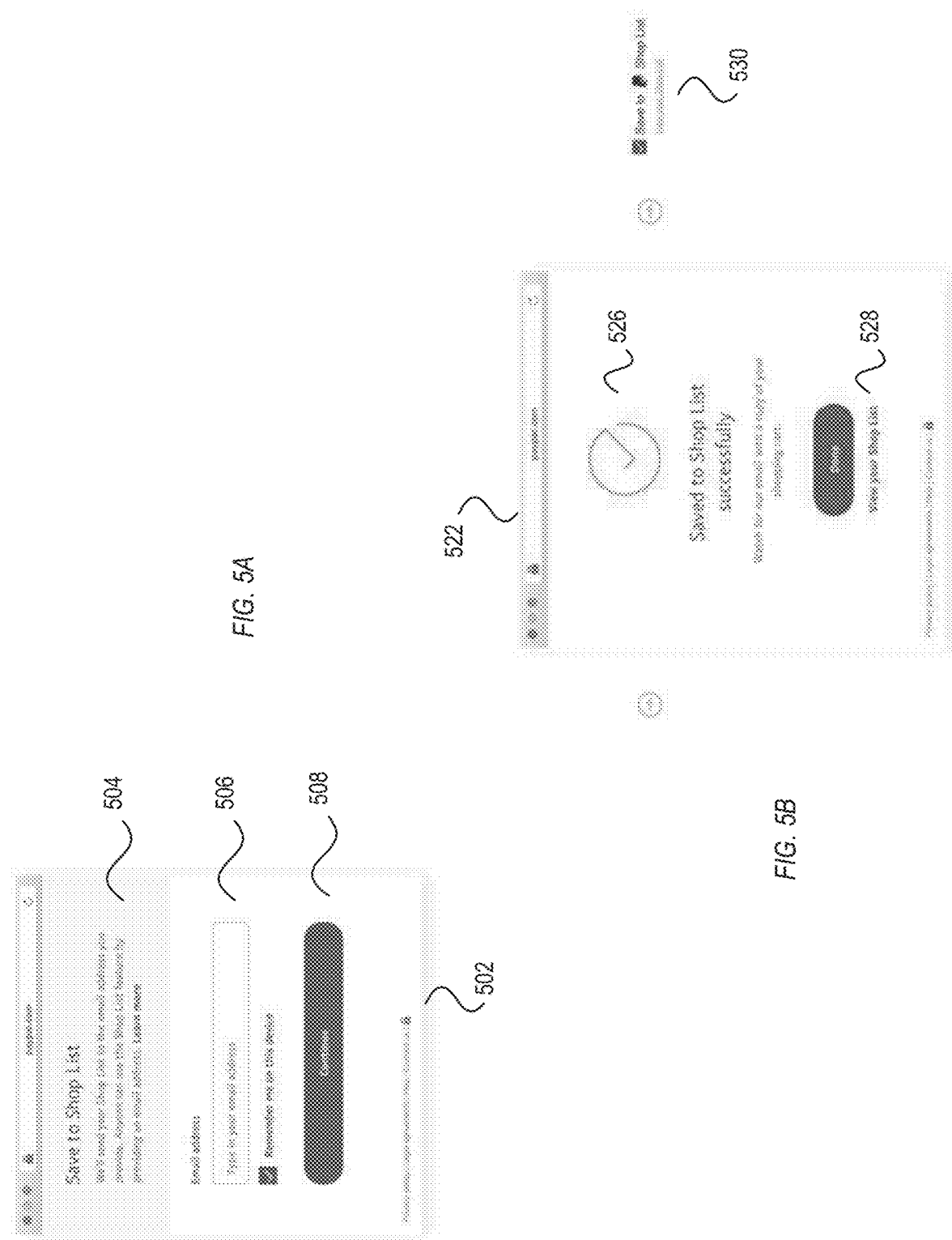
FIGS. 5A and 5B are diagrams illustrating embodiments of guest flow when accessing functionality of the merchant-side integrated shopping cart recovery.

FIGS. 5A and 5B are diagrams illustrating embodiments of guest flow when accessing functionality of the merchant-side integrated shopping cart recovery, according to some embodiments.

FIG. 5A illustrates an example screenshot (from the user device) of an UI element provided to the UI 120. FIG. 5A shows what an anonymous user will see via the anonymous experience via accessing the merchant application. FIG. 5A illustrates an example screen shot of the anonymous flow that can be switched to the guest flow once the user interacts with the UI element 502.

FIG. 5B shows a successful save to the shoplist cart. In some embodiments, the merchant can pass the SKUs for the selected items/services. The shoplist manager 106 can use those received SKUs to access data at a shoplist database to obtain products descriptions, customizations, etc. and then populate the UI with that data. In some embodiments, the merchant can pass the SKUs using the iFrame of the merchant webpage. The shoplist manager 106 can then use that data for an UI that is provided to the customer and/or to generate an email that is then sent to the customer. If the user has not logged in (e.g., from the sent email), the user would remain in the recognized state (i.e., the shoplist experience will continue in the recognized flow).

In some embodiments, while in recognized flow for a certain user, the shoplist manager 106 can receive selections from the user list script 120 indicating item selections by the customer software 102 when accessing the merchant application 104 or from another user list script of another merchant application (of another merchant). The selections can be processed and combined by the shoplist manager 106 to the user list 122 associated with the recognized user. The shoplist manager 106 can identify the user via a session ID w/the user list 122 being continuously updated for that user. The recognized state can act as a deferred login (e.g., until the user provides additional identifying information that would place the user being processed via the identified flow).

The shoplist manager 106 can communicate with the user list script 120 to provide information for display at the customer software 102. If the user accesses (e.g., via the customer software 102 or via another application at the user device 110) the other merchant application, the shoplist manager 106 can continue to track the user. If the user accesses the other merchant application in the recognized flow, the shoplist manager 106 can provide an obfuscated identifier to the user (via the other user list script) while the user is accessing the other merchant application. In some embodiments, the obfuscated identifier can be an obfuscated email address of the user.

Figure 6:
FIG. 6 is a diagram illustrating example UI of recognized flow when accessing functionality of the merchant-side integrated shopping cart recovery, according to some embodiments.

FIG. 6 is a diagram illustrating example UI of recognized flow when accessing functionality of the merchant-side integrated shopping cart recovery, according to some embodiments. The user list UI 602 can be displayed in the UI 124 of the user device 110 upon the user accessing the shoplist manager 106 directly, i.e., without accessing the merchant application 104. The user can be in the recognized or identified flow to access the user list UI 602. The user list UI 602 can indicate the items of the user list 122. The user list UI 602 can include multiple user list portions 604(1)-604(7), each portion associated with a different merchant. The user list UI 602 can display items 404(1)-404(3) corresponding to a selected user list portion, such as to the user list portion 604(2).

The user list UI 602 can also display a return to merchant icon 606, upon which the user can access the merchant application corresponding to the selected user list portion. In some embodiments, the selection of the return to merchant icon 606 can trigger a generation of a merchant cart for the corresponding merchant. In the example shown by FIG. 6, the generated merchant cart can include the items 404(1)-404(3) and be provided to the merchant application 104. The user can be then redirected from accessing the user list UI 602 to accessing the generated cart at the merchant application 104.

Figure 7A:
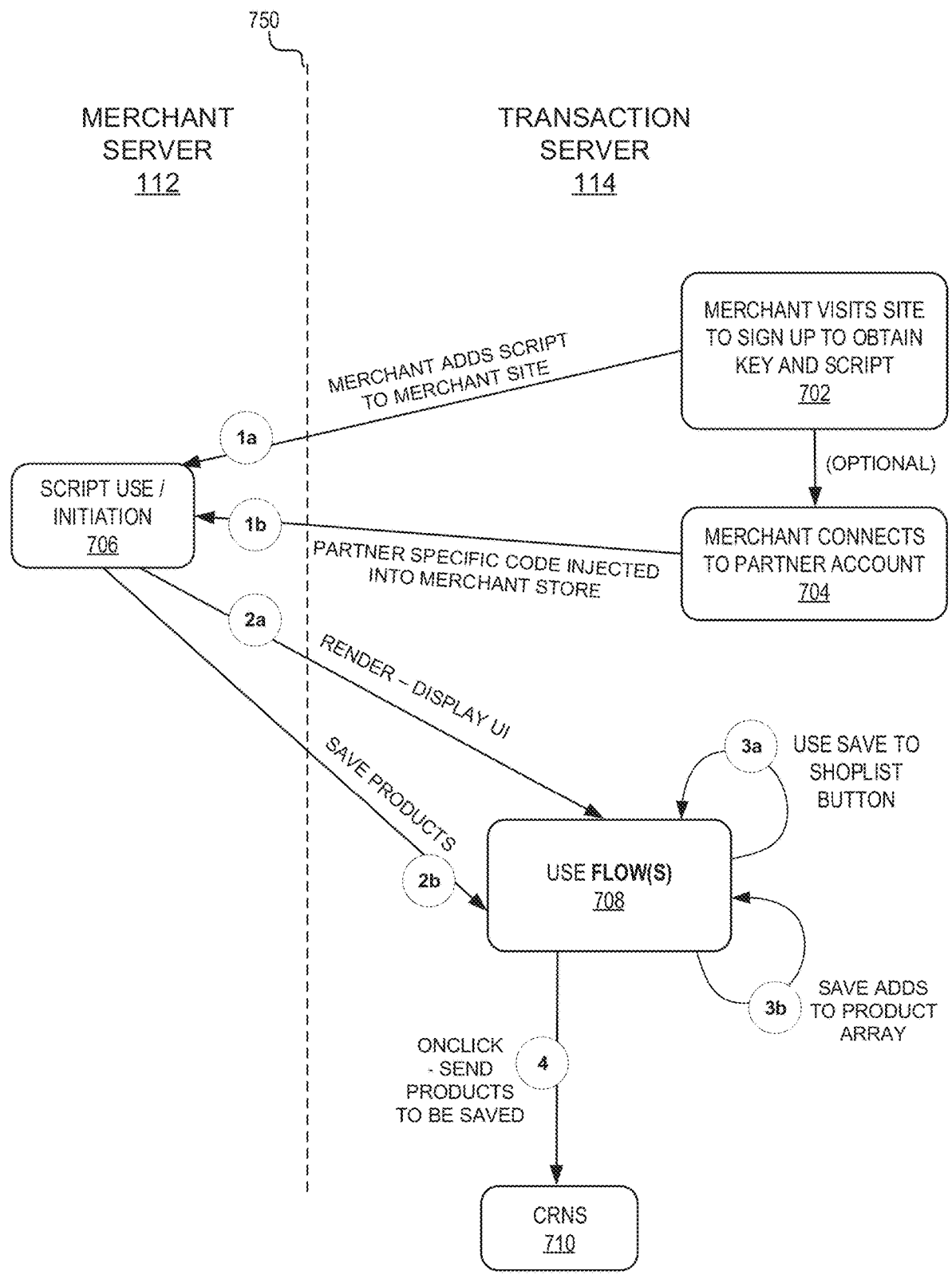
FIGS. 7A and 7B are diagrams illustrating embodiments of merchant onboarding onto a transaction system and use of the merchant-side integrated shopping cart recovery.
Figure 7B:
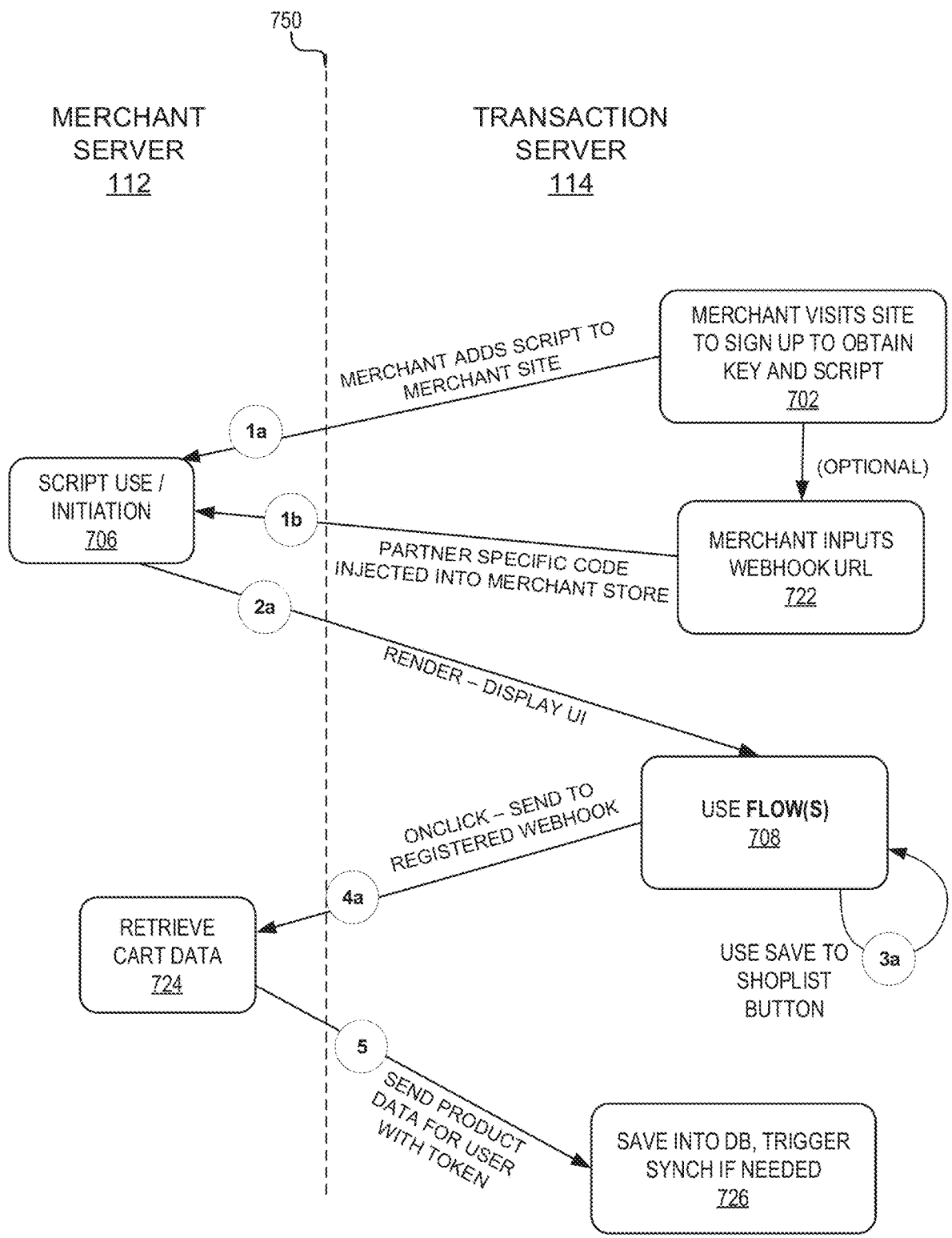

FIGS. 7A and 7B are diagrams illustrating embodiments of merchant onboarding onto a transaction system and use of the merchant-side integrated shopping cart recovery. In FIG. 7A, the merchant corresponding to the merchant server 112 is onboarded onto the shoplist manager 106. In general, the shoplist manager 106 maintains multiple user lists (including the user list 122 and/or transient user lists), one for each user. The users can access the merchant application 104 that is hosted by the merchant server 112. Depending on the user flow type, a certain user can access the merchant server anonymously, as a guest user, as a recognized user, or as an identified user, although variations are contemplated and additional or fewer user types can be used. The shoplist manager 106 enables a user log-in to the shoplist manager 106 to associate the user list 122 with the user account and independent of a user login at the merchant application 104. As shown in FIGS. 7A and 7B, operations performed by the merchant server 112 are shown to the left of a dotted line 750, and operations performed by the transaction server 114 are shown to the right of the dotted line 750. For example, step 702 is performed at the transaction server 114, but it is initiated at the merchant server 112.

FIG. 7A illustrates some embodiments of how the merchant server 112 can set up shoplist functionality at the merchant application 104. At step 702, the merchant can access the shoplist manager 106 to sign up for the shop list functionality, and to obtain the user list script 120 and any keys required for secure communication between the transaction server 114 and the merchant server 112. At optional step 704, a merchant partner (e.g., via a partner server) can connect to the merchant (e.g., via a partner account). The merchant partner can then perform one or more of the operations of 702 on the merchant's behalf. The merchant's (or partner's) access of the shoplist manager 106 can be done programmatically, e.g., in response to a user selection at the merchant server 112. At step 1a, the user list script 120 is added (e.g., by incorporating the user list script from the shoplist manager 106) to the merchant application 104. At step 1b (which is optional dependent on whether step 704 is performed), in addition to the user list script 120 being incorporated, any additional partner specific code can be added to the merchant application 104.

At 706, the merchant server 112 can use the user list script 120, which includes rendering and displaying the UI 124 at step 2a and saving products at step 2b. The user list script 120 can interact with the transaction server 114 to display products in the UI 124 that may be available for sale by the merchant. The transaction server 114 can obtain the list and characteristics of these products (e.g., product data) via a product feed, such as discussed below with reference to FIGS. 8 and 9. In some embodiments, at 706 the merchant server 112 can trigger the transaction server to provide the product data for the merchant at the user list script 120. In some embodiments, the merchant server 112 can pass details of the products for the user list 122 from client-side functionality on the merchant application 104 (e.g., a merchant webpage). Client-side functionality can include any selections received from the customer software 102 and/or operations performed at the merchant application 104 in response to user selections, that occur at the merchant application 104.

At 708, the shoplist manager can process user selections using the user flows. The user selection can be initiated at the user list script 120 (such as a shoplist button). The user can be initially processed using the anonymous or the guest flow discussed above. At step 3a, the shoplist manager 106 can save a user selected item at the user list script 120. In other words, in some embodiments, the user selection is initially saved locally at the merchant application 104 at the user list script 120. At step 4, the saved items can be communicated to the shoplist manager 106, where they can be stored at the user list 122 associated with the user. Depending on the user flow type, then user list 122 can be associated with the user account. For anonymous/guest user flows, the saved items can be stored using a transient user list, a transient database, or a similar structure that is associated with the user.

In some embodiments, the shoplist manager 106 keeps the transient user list as long as the user can be identified, e.g., via a user session and/or identifying characteristics of the user and/or the user device. The shoplist manager 106 can wait until the user logs in through the same user device, via email, or provides some identifying/authenticating data, upon which the user list 122 can be associated with the user account (e.g., at the shoplist manager 106). Otherwise, the shoplist manager 106 can discard the transient user list. At step 3b, the shoplist manager 106 can optionally save any advertisements associated with the selected items to the user list 122 (or to the transient user list 121).

FIG. 7B illustrates some embodiments of how the merchant server can set up and use shoplist functionality via the merchant webpage. FIG. 7B illustrates a Merchant Save Product Server to Server functionality is similar to the onboarding and use process discussed above with reference to FIG. 7A, with some differences noted below. At 722, the merchant server 112 can register webhooks (or a related callback technology) for callbacks to the transaction server 114 for shoplist functionality. At step 2a, during a rendering process, the merchant server can pass one or more SKU numbers (from a front-end functionality of the merchant) to the transaction server 114. The transaction server 114 can store and later use (e.g., at step 724) these SKU numbers by accessing the merchant server's 112 back-end to obtain the products/configurations for the selected items. At step 726, synchronization of the merchant's products may be performed. In some embodiments, one or more of steps 724 and 726, with associated steps 4a and 5, can be replaced by functionality shown by FIG. 9. For example, the synchronization of FIG. 9 can be performed continuously, obviating the need for step 4 of FIG. 7B.

Figure 8:
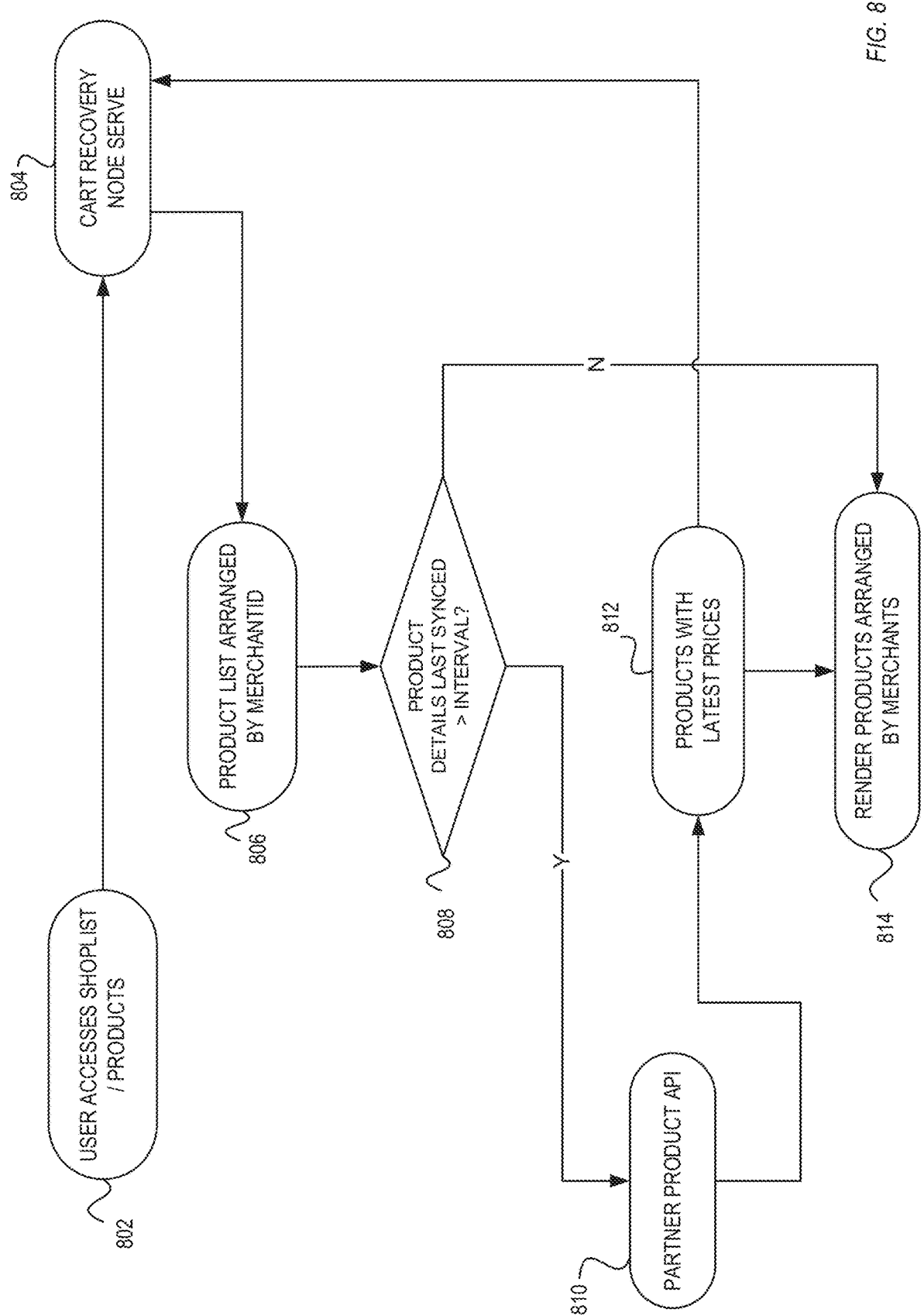
FIG. 8 is a diagram illustrating how the user list is updated and rendered in a UI, according to some embodiments.

FIG. 8 is a diagram illustrating how the user list is updated and rendered in a UI (e.g., the UI 124), according to some embodiments. However, the shoplist rendering can be implemented using other techniques. At 802, the user can access the user list 122 (or the transient user list 121), such as directly from the customer software 102 accessing the shoplist manager 106. Direct access can include a customer web browser accessing a web page that hosts the user list 122. At 804, responsive to the user list 122 (or to the transient user list 121) access, a cart recovery node is accessed, such as to obtain products indicated by the user access. At 806, the products can be arranged based on a merchant id associated with the user access. At 808, the shoplist manager 106 can determine whether the products were synchronized last time outside a certain interval. If the synchronization occurred outside the certain interval, flow continues at 810, otherwise the flow continues at 814. At 810, the shoplist manager 106 can access a partner product API for product synchronization. At 812, the products are updated with the latest information. From 812, both 804 and 814 are performed. From 812, the step 804 is performed while the product characteristics are changed based on performance of steps 810 and 812. At 814, the shoplist manager 106 renders products as arranged by merchants (and/or other criteria). For example, the user list UI 602 can be rendered for the selected merchant using the updated product characteristics.

Figure 9:
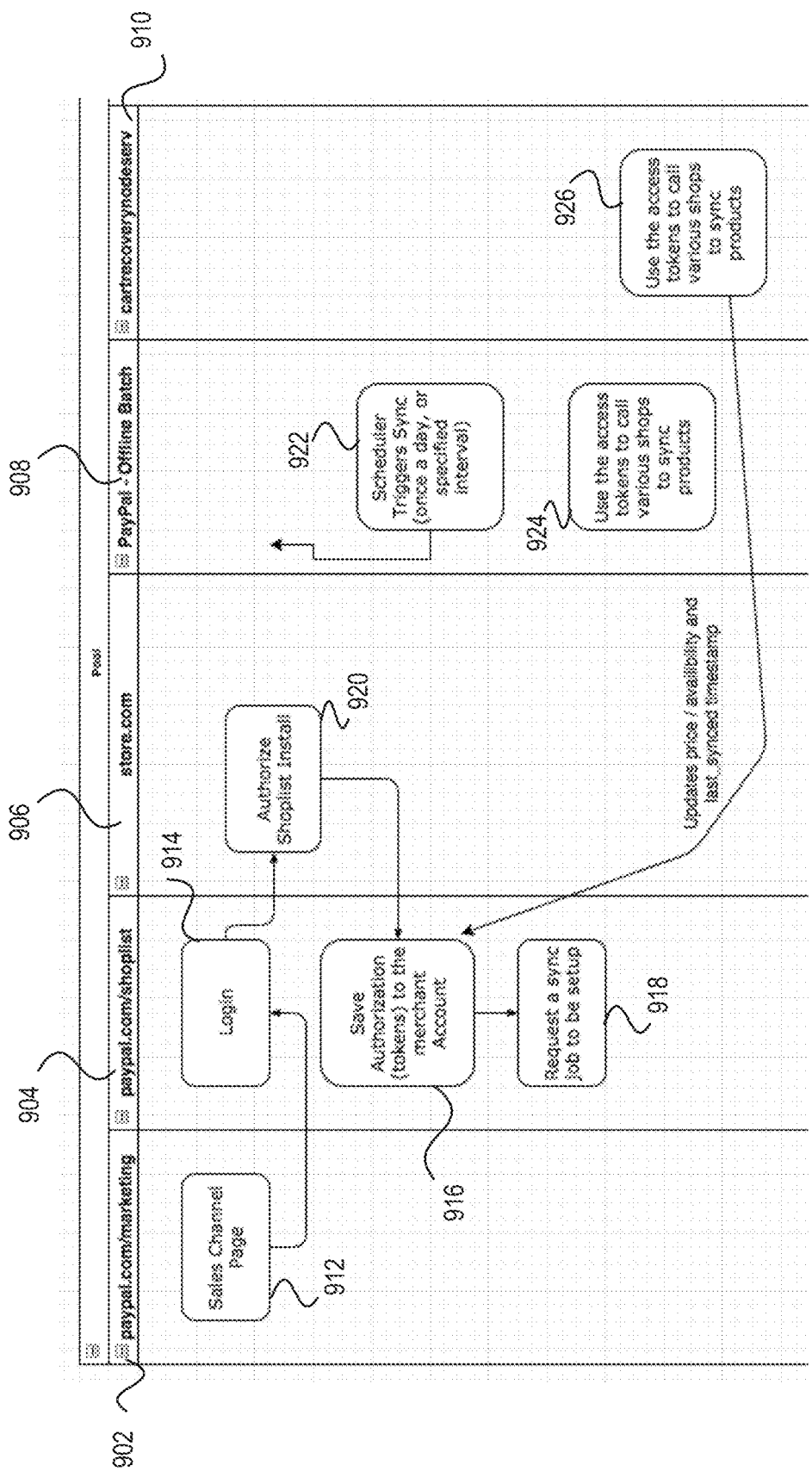
FIG. 9 is a diagram illustrating embodiments of how product feeds are synchronized at the shoplist provider server, according to some embodiments.

FIG. 9 is a diagram illustrating embodiments of how product feeds are synchronized at the transaction server 114. FIG. 9 illustrates how product data can be updated and used. In some implementations, URL, html, and other techniques can be used to provide the product data. As mentioned above, this can be performed instead of step 4 (and optionally 5), as the product feeds are synchronized after step 3a of FIG. 7B. In some implementations, the transaction server 114 can access own database copies to obtain data and/or configure product info as needed.

In some embodiments, the user list 122 can be synchronized between various entities using webhooks. In some embodiments, when the customer retrieves products from the user list 122 (or to the transient user list 121), the transaction server 114 may need to retrieve (e.g., using partner API's) latest information such as availability and price of the selected products/services (e.g., as discussed above with reference to FIG. 8).

Steps 912-916 illustrate sign-up of a merchant, during which the transaction server 114 can request (e.g., by sending a request over a network) the merchant server 121 to connect with their partner platform (e.g., with the partner API). At 914, the login into the transaction server 114 can be done programmatically. At 916, authorization tokens can be associated with the merchant account at the transaction server 114. At 918, a synchronization can be requested, such as by the cart recovery node (at step 926). The merchant server 112 can transmit a partner access token to the transaction server 114, which can be used to retrieve product information. To prevent over fetching, the transaction server 114 can only fetch when a user loads a page, e.g., via the customer software 102 access to view the user list 122 (or to the transient user list 121).

The transaction server 114 can implement a merchant table to contain partner and corresponding access token, as well as access products/services that have a merchant id. The transaction server 114 can add additional column to product tables that can store last_synced timestamp, so the transaction server 114 can only fetch and perform updates when necessary. For features like price tracking, the transaction server 114 can use partner webhooks (where supported) as well as fetching for prices/quantity at regular intervals. Step 926 illustrates how the cart recovery node serve (as discussed above at step 804) can use the access tokens to call various servers to sync products. Step 926 can be performed as a batch process initiated (e.g., at step 924) at the transaction server 114.

It should be understood that FIGS. 1-9 and the operations described herein are examples meant to aid in understanding embodiments and should not be used to limit embodiments or limit scope of the claims. Embodiments may perform additional operations, fewer operations, operations in a different order, operations in parallel, and some operations differently. For example, one or more elements, steps, or processes described with reference to the diagrams of FIGS. 1-9 may be omitted, described in a different sequence, or combined as desired or appropriate.

As will be appreciated by one skilled in the art, aspects of the present disclosure may be embodied as a system, method, or computer program product. Accordingly, aspects of the present disclosure may take the form of an entirely hardware embodiment, a software embodiment (including firmware, resident software, micro-code, etc.) or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible and/or non-transitory medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Computer program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The computer program code may execute (e.g., as compiled into computer program instructions) entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described with reference to flow diagram illustrations and/or block diagrams of methods, apparatus (systems) and computer program products according to embodiments of the present disclosure. It will be understood that each block of the flow diagram illustrations and/or block diagrams, and combinations of blocks in the flow diagram illustrations and/or block diagrams, can be implemented by computer program instructions. These computer program instructions may be provided to a processor of a general purpose computer, special purpose computer, or other programmable data processing apparatus to produce a machine, such that the computer program instructions, which execute via the processor of the computer or other programmable data processing apparatus, create means for implementing the functions/acts specified in the flow diagrams and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flow diagram and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flow diagrams and/or block diagram block or blocks.

Figure 10:
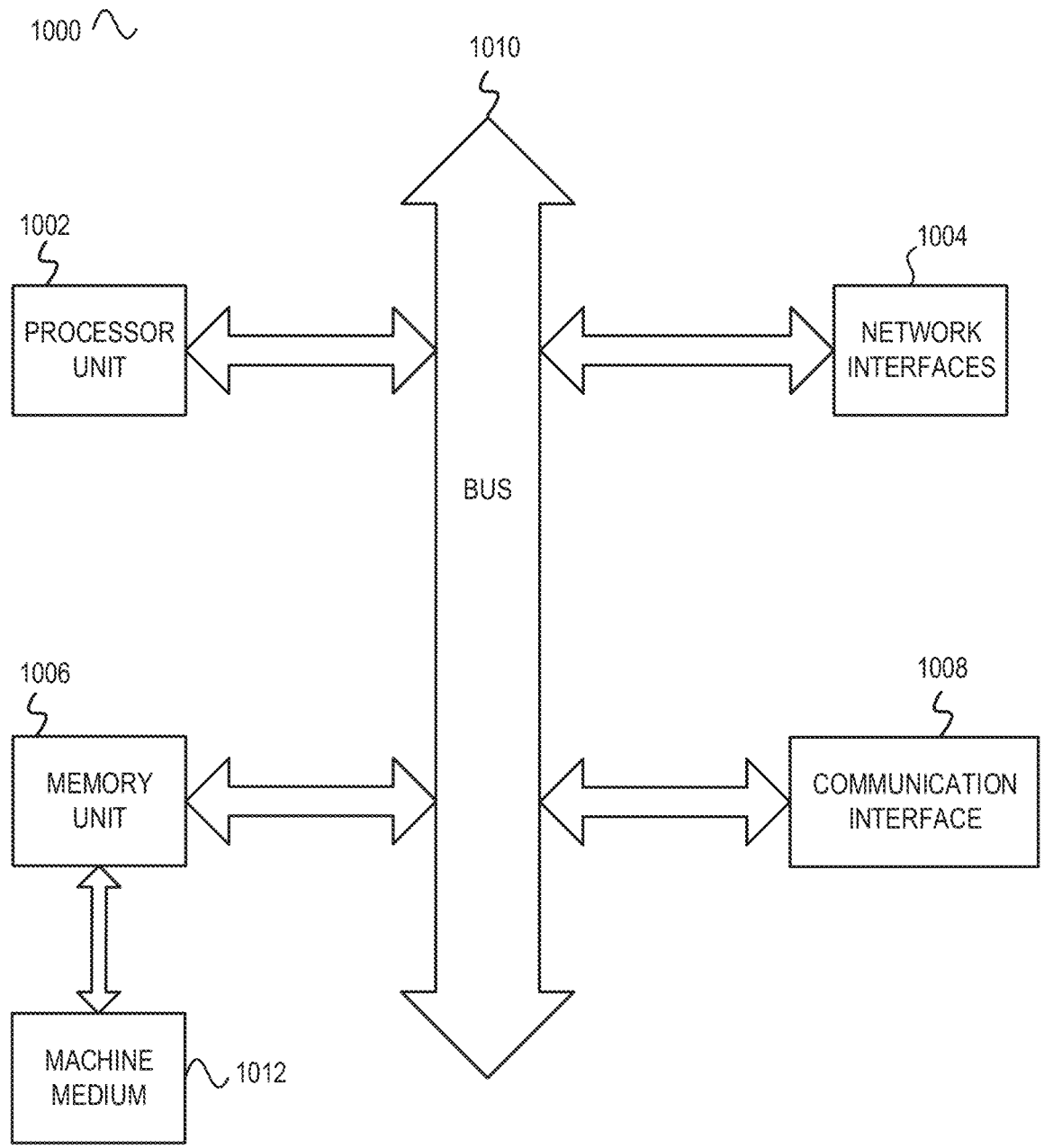
FIG. 10 is a block diagram of one embodiment of a device discussed with reference to FIGS. 1-9.

FIG. 10 is a block diagram of an exemplary embodiment of an electronic device 1000 including a communication interface 1008 for network communications. The electronic device can embody functionality to implement embodiments described in FIGS. 1-9 above. In some implementations, the electronic device 1000 may be a laptop computer, a tablet computer, a mobile phone, a powerline communication device, a smart appliance (PDA), a server, and/or one or more another electronic systems. For example, a user device may be implemented using a mobile device, such as a mobile phone or a tablet computer. For example, a payment system may be implemented using one or more servers. The electronic device 1000 can include a processor unit 1002 (possibly including multiple processors, multiple cores, multiple nodes, and/or implementing multi-threading, etc.). The electronic device 1000 can also include a memory unit 1006. The memory unit 1006 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The electronic device 1000 can also include the bus 1010 (e.g., PCI, ISA, PCI-Express, HyperTransport®, InfiniBand®, NuBus, AHB, AXI, etc.), and network interfaces 1004 can include wire-based interfaces (e.g., an Ethernet interface, a powerline communication interface, etc.). The communication interface 708 can include at least one of a wireless network interface (e.g., a WLAN interface, a Bluetooth interface, a WiMAX interface, a ZigBee interface, a Wireless USB interface, etc.). In some implementations, the electronic device 1000 may support multiple network interfaces—each of which is configured to couple the electronic device 1000 to a different communication network.

The memory unit 1006 can embody functionality to implement embodiments described in FIGS. 1-10 above. In one embodiment, the memory unit 706 can include one or more of functionalities that implements contextual pressure-sensing input. Any one of these functionalities may be partially (or entirely) implemented in hardware and/or on the processor unit 1002. For example, some functionality may be implemented with an application specific integrated circuit, in logic implemented in the processor unit 1002, in a co-processor on a peripheral device or card, etc. Further, realizations may include fewer or additional components not illustrated in FIG. 10 (e.g., video cards, audio cards, additional network interfaces, peripheral devices, etc.). The processor unit 1002, the memory unit 1006, the network interface 1004 and the communication interface 1008 are coupled to the bus 1010. Although illustrated as being coupled to the bus 1010, the memory unit 1006 may be coupled to the processor unit 1002.

While the embodiments are described with reference to various implementations and exploitations, it will be understood that these embodiments are illustrative and that the scope of the present disclosure is not limited to them. In general, techniques for implementing merchant-side integrated shopping cart recovery as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the present disclosure. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the present disclosure.

What is claimed is:

1. A method for merchant-side tracking of customer selections, the method comprising:
receiving, at a transaction server and via a user list script on a merchant webpage of a merchant server, a user selection of a product representation displayed on a user interface (UI) of a user device;
updating, at the transaction server, a user list with the user selection, the user list associated with a generic user representation of a user, wherein the updating the user list is performed at the transaction server that uses a separate user authentication from a user authentication requested at the merchant webpage, and wherein the user list is maintained by the transaction server for the user independently of user logging in to the merchant webpage and the transaction server;
determining, at the transaction server and based on a type of identifier associated with the user of the user device, to use the generic user representation with the user list;
selecting, at the transaction server and based on the generic user representation, an anonymous user flow type for tracking the user as an anonymous user of the merchant webpage, the anonymous user flow type associating the user device with the user list at the transaction server independently of authenticating the user or the user device with the merchant server;
switching, at the transaction server and based on identifying information of the user provided during the anonymous user flow type, from the anonymous user flow type to a guest user flow type for tracking the user as a guest user of the merchant webpage;
responsive to the switching, associating, at the transaction server, the user or the user device as the guest user at the merchant server using an identifier; and
enabling, at the transaction server, one or more uses of the guest user flow type by the merchant server and a different merchant server, wherein the one or more uses are enabled without requiring the user authentication.

2. The method of claim 1, wherein, prior to determining to use a recognized user flow type, the method further comprises:
determining, based on an identifying user selection, a user association with the user list;

in response to determining the user association, switching from the guest user flow type to the identified user flow type for tracking the user as an identified user of the merchant webpage; and in response to using the identified user flow type, providing a guest identifier to the user device for user identification and associating the user with the merchant.

3. The method of claim 2, further comprising
determining, based on a user opt-out selection, to disassociate the user from the user list;
in response to the determination to disassociate the user, switching to the anonymous user flow type; and
in response to using the anonymous user flow type, deleting the guest identifier from the user device and disassociating the user from the merchant.

4. The method of claim 1, further comprising:
determining, based on the identifier, a user association with the user list; and
in response to determining the user association, generating a cart based on the user list, the cart for submission at the merchant, wherein the cart is submitted independent of the user authenticating at the merchant for associating the cart and a user account at the transaction server that updates the user list with an account at the merchant webpage.

5. The method of claim 4, further comprising:
determining a second merchant that is associated with the user list, wherein the user list comprises the user selection for a product at the merchant and another user selection for another product at the second merchant; and
generating a second cart based on the user list, the second cart for submission at the second merchant.

6. The method of claim 1, further comprising:
receiving, via another user script on another merchant webpage of another merchant server, another user selection of another product representation displayed on the UI of the user device;
updating the user list with the another user selection; and
determining, based on the guest user flow type and on the receipt of the another user selection, a recognized user flow type that associates the user, without the user authentication, across user access to the merchant server and the another merchant server.

7. The method of claim 1, further comprising:
onboarding the merchant onto the transaction server that maintains user lists for users that anonymously access the merchant webpage, wherein the transaction server enables a user log-in to the transaction server to associate the user list with a user account of the transaction server independently of a login at the merchant.

8. The method of claim 1, wherein the identifier comprises a digital fingerprint that is stored at the transaction server that maintains the user list.

9. The method of claim 1, wherein the identifier comprises associating the user with a token that is stored at the user device, wherein the token is independent of a user login into the transaction server, wherein the token is independent of another user login into the merchant webpage.

10. The method of claim 1, wherein the recognized user flow type further enables tracking of a plurality user selections without reentry of a user account identifier during a plurality of sessions by the user with the merchant server and the different merchant server.

11. A non-transitory machine-readable medium having instructions stored thereon, the instructions executable to cause performance of operations comprising:

receiving, at a transaction server via a user list script on a merchant webpage of a merchant server, a user selection of a product representation displayed on a user interface (UI) of a user device;
updating a user list with the user selection, the user list associated with a generic user representation and including another user selection of another product representation displayed on the UI of the user device detected on another merchant webpage of a different merchant server;
determining, based on a type of identifier associated with a user of the user device, to use the generic user representation with the user list;
selecting, based on the generic user representation, an anonymous user flow type for tracking the user as an anonymous user of the merchant webpage, the anonymous user flow type associating the user device with the user list at the transaction server independently of authenticating the user or the user device with the merchant server;
switching, at the transaction server and based on identifying information of the user provided during the anonymous user flow type, from the anonymous user flow type to a guest user flow type for tracking the user as a guest user of the merchant webpage;
responsive to the switching, associating the user or the user device as the guest user at the merchant server using an identifier;
determining, based on the guest user flow type and on the another user selection, to use a recognized user flow type that associates the user, without a user authentication at the merchant server or the different merchant server, across user access to the merchant server and the different merchant server; and
enabling one or more uses of the guest user flow type and the recognized user flow type by the merchant server and the different merchant server, wherein the one or more uses are enabled independent of the user authentication.

12. The non-transitory machine-readable medium of claim 11, wherein, prior to determining to use the recognized user flow type, the operations further comprise:
determining, based on an identifying user selection, a user association with the user list;
in response to determining the user association, selecting an identified user flow type for tracking the user as an identified user of the merchant webpage; and
in response to using the identified user flow type, dropping a cookie on the user device for user identification and associating the user with the merchant.

13. The non-transitory machine-readable medium of claim 11, wherein the operations further comprise:
in response to a subsequent selection of the anonymous user flow type, deleting the identifier from the user device and disassociating the user from the merchant.

14. The non-transitory machine-readable medium of claim 7, wherein the operations further comprise:
determining a second merchant that is associated with the user list, wherein the user list comprises the user selection for a product at the merchant and another user selection for another product at the second merchant; and
generating a second cart based on the user list, the second cart for submission at the second merchant.

15. The non-transitory machine-readable medium of claim 11, wherein:

the updating the user list is performed at the transaction server that uses a separate user authentication from the merchant webpage, wherein the user list is maintained by the transaction server for the user independently of user login to the merchant webpage, wherein the user list is further maintained by the transaction server for the user independently of user login to the transaction server.

16. A system comprising:

a non-transitory memory; and one or more hardware processors coupled to the non-transitory memory and configured to read instructions from the non-transitory memory to cause the system to perform operations comprising:

receiving, at a transaction server associated with the system and via a user list script on a merchant webpage of a merchant server, a user selection of a product representation displayed on a user interface (UI) of a user device;

updating, at the transaction server, a user list with the user selection, the user list associated with a generic user representation of a user, wherein the updating the user list is performed at the transaction server that uses a separate user authentication from a user authentication requested at the merchant webpage, and wherein the user list is maintained by the transaction server for the user independently of user logging in to the merchant webpage and the transaction server;

determining, at the transaction server and based on a type of identifier associated with the user of the user device, to use the generic user representation with the user list;

selecting, at the transaction server and based on the generic user representation, an anonymous user flow type for tracking the user as an anonymous user of the merchant webpage, the anonymous user flow type associating the user device with the user list at the transaction server independently of authenticating the user or the user device with the merchant server;

switching, at the transaction server and based on identifying information of the user provided during the anonymous user flow type, from the anonymous user flow type to a guest user flow type for tracking the user as a guest user of the merchant webpage;

responsive to the switching, associating the user or the user device as the guest user at the merchant server using an identifier; and enabling one or more uses of the guest user flow type by the merchant server and a different merchant server, wherein the one or more uses are enabled without requiring the user authentication.

17. The system of claim 16, wherein, prior to determining to use a recognized user flow type, the operations further comprise:

determining, based on an identifying user selection, a user association with the user list;

in response to determining the user association, switching from the guest user flow type to an identified user flow type for tracking the user as an identified user of the merchant webpage; and in response to using the identified user flow type, providing a guest identifier to the user device for user identification and associating the user with the merchant.

18. The system of claim 17, wherein the operations further comprise:

determining, based on a user opt-out selection, to disassociate the user from the user list;

in response to the determination to disassociate the user, switching to the anonymous user flow type; and in response to using the anonymous user flow type, deleting the guest identifier from the user device and disassociating the user from the merchant.

19. The system of claim 16, wherein the operations further comprise:

determining, based on the identifier, a user association with the user list; and in response to determining the user association, generating a cart based on the user list, the cart for submission at the merchant, wherein the cart is submitted independent of the user authenticating at the merchant for associating the cart and a user account at the transaction server that updates the user list with an account at the merchant webpage.

20. The system of claim 19, wherein the operations further comprise:

determining a second merchant that is associated with the user list, wherein the user list comprises the user selection for a product at the merchant and another user selection for another product at the second merchant; and generating a second cart based on the user list, the second cart for submission at the second merchant.

* * * * *